(12) United States Patent
Becker et al.

(10) Patent No.: US 7,430,068 B2
(45) Date of Patent: Sep. 30, 2008

(54) LASER SCANNER

(75) Inventors: Reinhard Becker, Ludwigsburg (DE); Bernd-Dietmar Becker, Ludwigsburg (DE)

(73) Assignee: Fero technologies, Inc., Lake Mary, FL (US)

( * ) Notice: Subject to any disclaimer, the term of this patent is extended or adjusted under 35 U.S.C. 154(b) by 1029 days.

(21) Appl. No.: 10/854,319

(22) Filed: May 26, 2004

(65) Prior Publication Data

US 2005/0141052 A1   Jun. 30, 2005

(30) Foreign Application Priority Data

Dec. 29, 2003   (DE) .......................... 203 20 216 U

(51) Int. Cl.
  *H04N 1/46* (2006.01)
  *H04N 1/04* (2006.01)
(52) U.S. Cl. ....................... 358/511; 358/505; 358/474; 358/475
(58) Field of Classification Search .................. 358/511, 358/505, 474, 475; 356/359, 360
See application file for complete search history.

(56) References Cited

U.S. PATENT DOCUMENTS 6,069,700 A * 5/2000 Rudnick et al. ............. 356/511

2006/0109536 A1 * 5/2006 Mettenleiter et al. ........ 359/196
2006/0245717 A1 * 11/2006 Ossig et al. .................. 385/147

OTHER PUBLICATIONS iQsun Laserscanner Brochure, 2 pages, Aug. 24, 2004.

* cited by examiner

*Primary Examiner*—Houshang Safaipour
(74) *Attorney, Agent, or Firm*—Cantor Colburn LLP

(57) ABSTRACT

A laser scanner has a first axis and a second axis extending essentially transversely to the first axis. A measuring head is adapted to be rotated about the first axis. The measuring head has at least a first, a second, and a third module, wherein at least the first module and the third module are releasably connected to each other. A first rotary drive for rotating said measuring head is comprised within the first and the second modules. A rotary mirror is adapted to be rotated about the second axis. The rotary mirror is comprised within the third module. A second rotary drive is provided for rotating the rotary mirror. The second drive is likewise comprised within the third module. A transmitter is provided in the measuring head for transmitting a light beam. A receiver is provided in the measuring head for receiving the light beam after a reflection thereof by an object located at a distance from the laser scanner. A computer is provided in the measuring head for processing signals embedded within the received light beam.

33 Claims, 2 Drawing Sheets

LASER SCANNER

FIELD OF THE INVENTION

The present invention relates to the field of 3D laser scanners.

More specifically, the present invention relates to the field of 3D laser scanners having a measuring head adapted to be rotated about a first axis, a first rotary drive for rotating the measuring head, a rotary mirror adapted to be rotated about a second axis extending essentially transversely to the first axis, a second rotary drive for rotating the rotary mirror, a transmitter arranged in the measuring head for transmitting a light beam, a receiver arranged in the measuring head for receiving the light beam after a reflection thereof by an object located at a distance from the laser scanner, and a computer arranged in the measuring head for processing signals embedded within the received light beam.

BACKGROUND OF THE INVENTION

Laser scanners of the type specified above are commercially available, e.g. under the trade name "iQsun 625" from the assignee of the present application.

Laser scanners of this type are conventionally used for scanning closed or open spaces like interior spaces of buildings, industrial installations, tunnels and the like. The rotary mirror, rotating at high speed about a horizontal axis, generates a fan of light beams in a vertical plane. This fan of light beams, in one type of 3D laser scanners, is in turn rotated about a vertical axis through the entire surrounding space with a much slower rotational speed. In other types of 3D laser scanners the fan of light beams is not rotated but displaced along a given trajectory, for example on board of a wagon moving through a tunnel.

The light reflected by objects within the space surrounding the laser scanner is received by the laser scanner and is processed. When doing so, the reflectivity as well as the distance for any measured point is determined. Seen as a whole, the laser scanner thereby generates a true 3D image of the space surrounding the laser scanner with 360° spatial angle under ideal conditions or along a given trajectory.

Such laser scanners are relatively complicated and sophisticated instruments and, hence, accordingly expensive. On the other hand, in practice such laser scanners are distinctly configured for distinct operational and measuring requirements, wherein the decisive criteria are the precision of the measuring results, the spatial measuring range and, finally, the particular rotating mirror design.

If a user, for cost reasons, makes a decision for a specific type of a laser scanner being in the lower range of these criteria, then he/she is bound to this class of specifications. This means that the user, in case that at a later stage a scanner of a higher class of specifications is required, and the user is willing to make an accordingly higher investment, an entirely new instrument must be purchased even if the higher requirements concern only a few of the laser scanner components.

Moreover, in case of a malfunction of the laser scanner, the entire instrument is down and must be serviced. Considering that there exist only a few specialized manufacturers of such laser scanners worldwide, such service or repair may require shipping the instrument over long distances.

It is, therefore, an object of the present invention, to provide a laser scanner of the type specified at the outset such that these drawbacks are overcome. In particular, it shall become possible to provide a laser scanner with which a user may step from one class of specifications to another class without the necessity to purchase an entirely new instrument. Further, it shall be possible to reduce the down time of a defective laser scanner to a minimum.

SUMMARY OF THE INVENTION

According to the present invention, the afore-specified object is achieved by a laser scanner having a first axis, a second axis extending essentially transversely to the first axis, a measuring head adapted to be rotated about the first axis, the measuring head having at least a first, a second, and a third module, wherein at least the first module and the third module are releasably connected to each other, a first rotary drive for rotating the measuring head, the first rotary drive being comprised within the first and the second modules, a rotary mirror adapted to be rotated about the second axis, the rotary mirror being comprised within the third module, a second rotary drive for rotating the rotary mirror, the second drive being likewise comprised within the third module, a transmitter arranged in the measuring head for transmitting a light beam, a receiver arranged in the measuring head for receiving the light beam after a reflection thereof by an object located at a distance from the laser scanner, and a computer arranged in the measuring head for processing signals embedded within the received light beam.

The object underlying the invention is, thus, entirely achieved.

With a laser scanner according to the present invention, a user may, namely, in the first place purchase a model in which the various components are in the lowermost range of specifications such that the purchase price is relatively low. When the requirements of the user develop positively, for example in that a higher spatial measuring range or, alternately, a higher mechanical or electronic quality and, concurrently a higher precision of the measurement is required, then the user may make a decision to replace only some of the scanner modules, while other modules may still continue to be used. It is, thus, possible to upgrade the scanner into a higher class of specifications at lower costs as compared to conventional laser scanners where an upgrade necessitated the purchase of an entirely new instrument.

Of course, for a user owning a wide selection of modules of a laser scanner according to the present invention, it is possible to assemble a specific combination of modules for a specific measuring task. For example, if there are only moderate requirements for a specific measuring task, then the laser scanner may be equipped with modules from the lowermost range only such that in case of a measurement to be performed under rough external conditions bearing the risk of a damage during the measurement, only the less expensive modules are exposed to the risk of damage. The user may restrict the use of the most expensive and high-quality modules to applications with the highest requirements e.g. to the spatial measuring range and the precision of measuring results. Under such special circumstances, specific provisions may be taken to avoid damage to such highly expensive modules.

Finally, servicing is simplified. If, namely, only one specific module of a laser scanner according to the present invention fails, then only that particular module needs to be replaced which may be effected quickly and at tolerable costs through courier services. This is of particular advantage when there is a long geographical distance between the customer and the manufacturer. In that case the module exchange may be effected within a short period of time.

Another advantage of the laser scanner according to the present invention is that the user may under certain circumstances combine modules of different manufacturers, thus also increasing the flexibility on the user's side.

Finally, the laser scanner according to the present invention enables the user to start with a basic version with the required minimum number of components or modules, and then to continue with an extended version in which further functions are implemented into the laser scanner, for example a fully integrated processing and display of the measuring results.

Under normal operational conditions of the laser scanner the first axis preferably extends vertically and the second axis extends horizontally.

In a preferred embodiment of the present invention the first rotary drive comprises a base, a rotor rotatable relative to the base, and a drive motor for rotating the rotor, the base together with the rotor being comprised within the first module and the drive motor being comprised within the second module. The first module is preferably arranged centrally and at a lower side of the measuring head, the second module being arranged laterally and likewise at the lower side of the measuring head.

Under normal operational conditions of the laser scanner the base is held stationary.

This measure has the advantage that also with respect to the drive components a modular design is made such that different drive motors for driving the rotor may be used or different rotors for the same drive motor. Positioning these modules at the underside of the measuring head has the advantage that these modules are not an obstacle.

In a preferred modification of this embodiment the rotor has at least one leg with at least one further module being adapted to be attached thereto. The at least one leg is preferably configured integral with the rotor and there may be two legs extending parallel to each other and parallel to the first axis.

These measures have the advantage that the various modules may easily be assembled together, the first module being the base module. The legs may be configured such as to allow a mechanical and/or an electrical interconnection between the modules by simple plugging. The integral design has the advantage that a high mechanical stability is achieved so that the individual modules may be oriented exactly with respect to each other.

It is, further, preferred when the legs delimit a gap between them, in particular when the gap is dimensioned such as to receive the rotary mirror.

This measure has the advantage that almost the entire rotational angle of 360° may be utilized during rotation of the rotary mirror about its horizontal axis. Only in the area bridging the two legs there is a small shading angle, limiting the measuring range.

Insofar, it is further preferred if an optical reference mark is situated within the rotor between the legs.

This measure has the advantage that the mechanical bridge between the legs is utilized to generate a predetermined mark in space that can be used for calibrating purposes.

In another embodiment of the invention, the base has standardized pegs, adjustable feet and a bubble level, and the second module may, further, comprise an inclination sensor.

These measures have the advantage that the laser scanner may be reliably installed and calibrated at the measurement site, such that the two axes are oriented exactly vertically and horizontally, resp.

In a further embodiment of the invention, the third module is arranged laterally and at an upper side of the measuring head, wherein the rotor preferably has two legs extending parallel to each other and parallel to the first axis, the third module being attached to one of the legs, and wherein the rotary mirror may extend through a form-fitting opening within the leg.

These measures have the advantage that the rotary mirror with its second rotary drive may be arranged simply and precisely on the measuring head, wherein the lateral positioning at the upper side of the measuring head yields the maximum possible freedom for the measuring beam. The arrangement of the rotary mirror within a form-fitting opening in the leg has the further advantage that the rotary mirror axis may be adjusted precisely relative to the other modules.

In another embodiment of the invention, the receiver is comprised within a fourth module, the fourth module being arranged laterally and at an upper side of the measuring head, the receiver preferably comprising a range finder.

This measure has the advantage that the receiver is positioned at an optimum and mechanically stable position.

In a further embodiment of the invention, the transmitter is comprised within the third module.

This measure has the advantage that a most compact design is possible with the rotary mirror, its associated rotary drive and the transmitter all integrated into the third module.

In another embodiment of the invention, the computer is comprised within a fifth module, wherein the computer may comprise a control panel. Preferably, the fifth module is arranged laterally and at a lower side of the measuring head. The third and the fourth module on the one hand and the second and the fifth module on the other hand may be arranged on opposite sides of the first module.

Seen as a whole, a configuration is achieved in which the first module is located in the centre of the measuring head with the third and the fourth modules on opposite lateral sides thereof above and the second and fifth modules on opposite lateral sides thereof below. This results in an extremely compact and technically suitable configuration.

It is preferred when the first and the third modules, the first and the fourth modules, and the first and the fifth modules are mechanically interconnected by means of form fitting mechanical connectors. Further, the first and the second modules may be configured integral with each other.

These measures have the advantage that a most reliable mechanical assembly of the modules is achieved, nevertheless allowing a quick disassembly thereof after use.

The first and/or the second and/or the third and/or the fourth and/or the fifth modules are preferably electrically interconnected by means of a CAN bus.

This measure has the advantage that all modules or any given sub-combination of modules may interact electronically, wherein the interconnection of the modules involved may simply be effected by plugging.

Further advantages will become apparent from the description and the enclosed drawing.

It goes without saying that the features mentioned above and those that will be explained hereinafter may not only be used in the particular given combination but also in other combinations or alone without departing from the scope of the present invention.

BRIEF DESCRIPTION OF THE DRAWINGS

An embodiment of the invention is illustrated in the enclosed drawing in which.

DETAILED DESCRIPTION OF THE PREFERRED EMBODIMENTS

Figure 1:
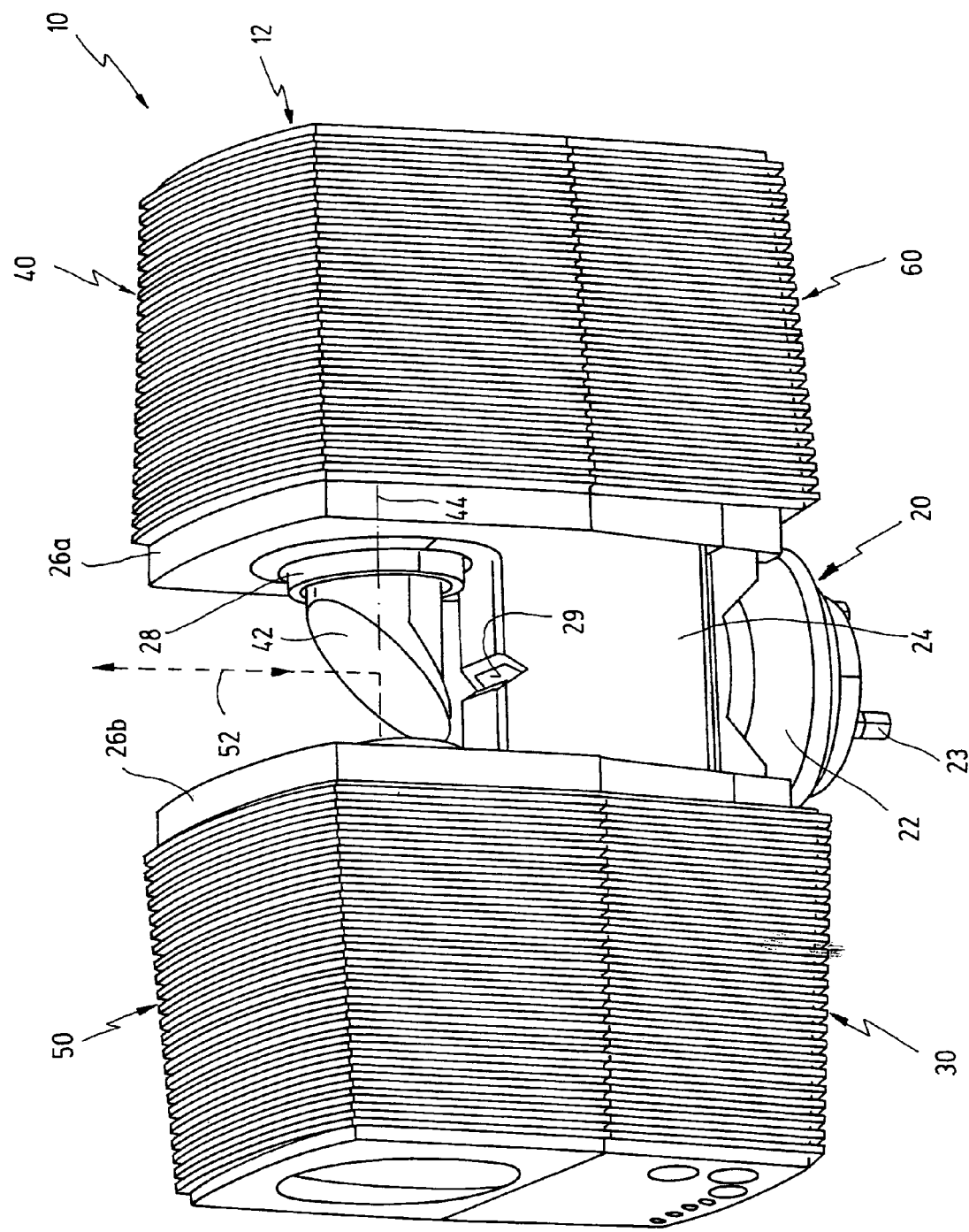
FIG. 1 shows a perspective view, from above, of an embodiment of a laser scanner according to the present invention.

In the figures, reference numeral 10 as a whole denotes a laser scanner having a measuring head 12 conventionally arranged e.g. on a tripod (not shown). The measuring head 12 consists of five modules 20, 30, 40, 50 and 60.

Figure 2:
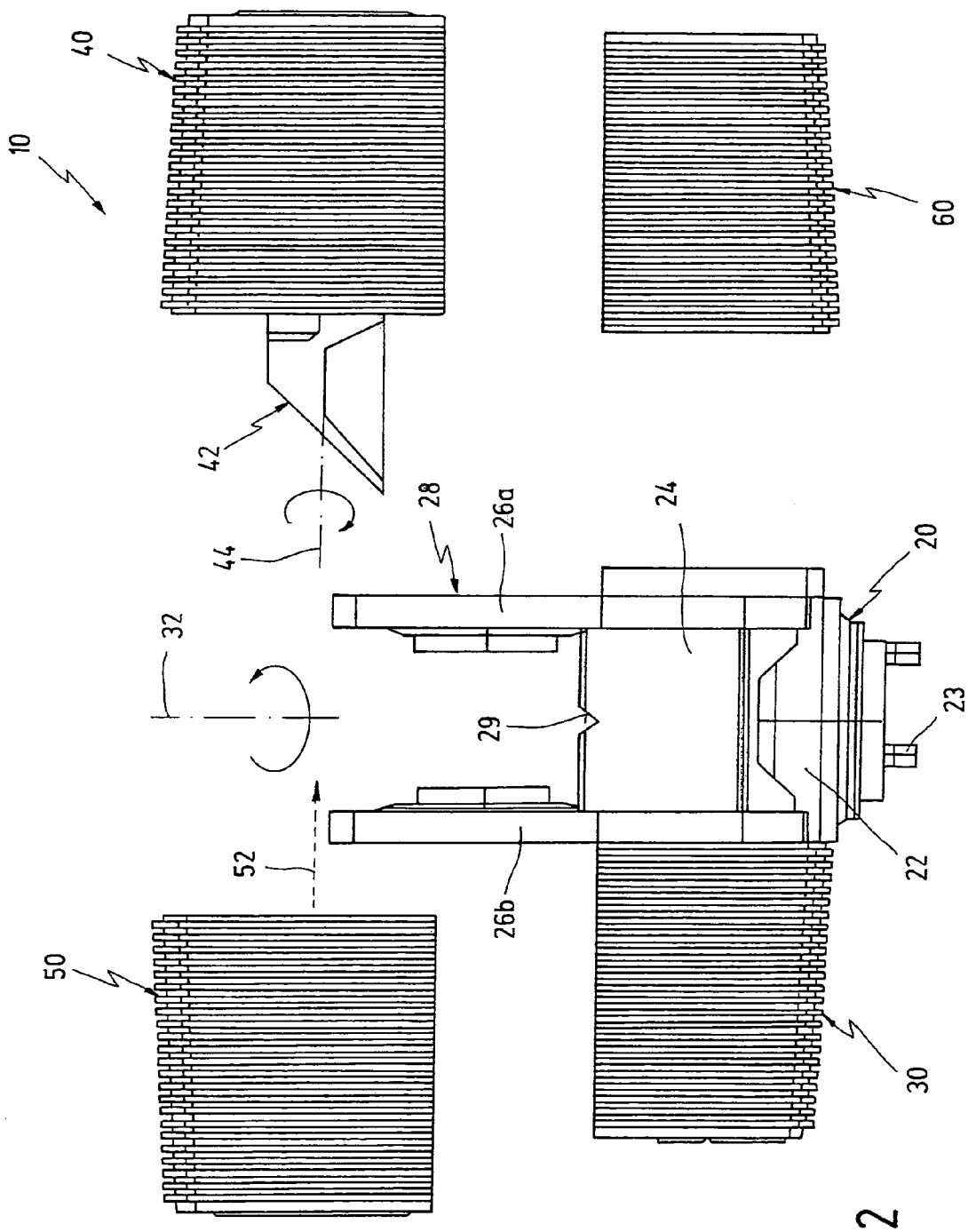
FIG. 2 shows the laser scanner of claim 1, however, in an exploded view.

A first module 20 is a rotary unit. First module 20 houses a base 22 held stationary under normal operational conditions. Base 22 has standardized pegs 23 or vertically adjustable feet as well as a bubble level (not shown). Standardized pegs 23 may be adapted to commercially available tripods to enable an easy click-connection with laser scanner 10. A rotor 24 is located on base 22. Rotor 24 has lateral legs 26a, 26b preferably integral with its support structure. Legs 26a, 26b extend parallel, vertical and at a distance from each other. Right hand leg 26b in FIGS. 1 and 2 has a through-opening 28 for a rotary mirror, as will be explained below. A reference mark 29 configured as a notch is provided in the central range of rotor 24 bridging legs 26a and 26b.

A second module 30 is connected to rotor 24 in the left and lower area of measuring head 12. Second module 30 houses a first drive motor as well as an inclination sensor. The motor is used for rotating rotor 24 about a vertical axis 32 relatively to base 22. This rotation is effected at relatively low rotational speed.

A third module 40 is connected to the exterior surface of right hand leg 26b in an upper area thereof. Third module 40 houses a light transmitter as well as the rotary mirror 42 mentioned above. Rotary mirror 42 extends through through-opening 28 within leg 26b. Third module 40, moreover, comprises a further drive motor for rotary mirror 42 for rotating same about a horizontal axis 44 at a very high rotational speed.

A fourth module 50 is connected to the exterior surface of left hand leg 26a of rotor 24 in an upper area thereof. Fourth module 50 houses a receiver having a range finder. According to the specific design, fourth module 50 instead of third module 40 may also comprise the light transmitter. Reference numeral 52 in FIG. 1 denotes such a light beam which, in any event is received as a light beam reflected from objects to be scanned in the space surrounding laser scanner 10. Incoming light beam 52 is reflected by rotary mirror 42 and is guided along horizontal axis 44 to the receiver comprised in fourth module 50.

A fifth module 60 is laterally connected to rotor 24 at a lower area thereof. Fifth module 60 houses a computer or any other data processor and, preferably a control panel.

As may be seen from the figures, an extremely compact assembly is thus achieved in which the individual modules may be combined by simply plugging same together. The required mechanical connections are preferably made by form-fitting openings or pegs, resp., whereas the required electrical connections are preferably made by appropriate electrical connectors and a CAN bus.

It goes without saying that the distribution of the various functions as explained above in connection with the illustrated embodiment is just an example as is also the number of modules. In particular, it is possible to distribute the functions otherwise as already explained with respect to the light transmitter. Further, the modules may in turn be divided into sub-modules, and some modules may also be structurally combined as for example first module 20 and second module 30 which may be structurally integrated into one common base and drive module.

The invention claimed is:

1. A laser scanner having
a first axis;
a second axis extending essentially transversely to said first axis;
a measuring head adapted to be rotated about said first axis, said measuring head having at least a first, a second, and a third module, wherein at least said first module and said third module are releasably connected to each other;
a first rotary drive for rotating said measuring head, said first rotary drive being comprised within said first and said second modules;
a rotary mirror adapted to be rotated about said second axis, said rotary mirror being comprised within said third module;
a second rotary drive for rotating said rotary mirror, said second drive being likewise comprised within said third module;
a transmitter arranged in said measuring head for transmitting a light beam;
a receiver arranged in said measuring head for receiving said light beam after a reflection thereof by an object located at a distance from said laser scanner;
a computer arranged in said measuring head for processing signals embedded within said received light beam.

2. The laser scanner of claim 1, wherein said first rotary drive comprises a base, a rotor rotatable relative to said base, and a drive motor for rotating said rotor, said base together with said rotor being comprised within said first module and said drive motor being comprised within said second module.

3. The laser scanner of claim 1, wherein said first module is arranged centrally and at a lower side of said measuring head, said second module being arranged laterally and likewise at said lower side of said measuring head.

4. The laser scanner of claim 2, wherein said rotor has at least one leg with at least one further module being adapted to be attached thereto.

5. The laser scanner of claim 4, wherein said leg is configured integral with said rotor.

6. The laser scanner of claim 4, wherein said rotor has two legs, said legs extending parallel to each other and parallel to said first axis.

7. The laser scanner of claim 6, wherein said legs delimit a gap between them.

8. The laser scanner of claim 7, wherein said gap is dimensioned such as to receive said rotary mirror.

9. The laser scanner of claim 7, wherein an optical reference mark is situated within said rotor between said legs.

10. The laser scanner of claim 2, wherein said base has standardized pegs, adjustable feet and a bubble level.

11. The laser scanner of claim 2, wherein said second module, further, comprises an inclination sensor.

12. The laser scanner of claim 11, wherein said third module is arranged laterally and at an upper side of said measuring head.

13. The laser scanner of claim 6, wherein said rotor has two legs, said legs extending parallel to each other and parallel to said first axis, said third module being attached to one of said legs.

14. The laser scanner of claim 13, wherein said rotary mirror extends through a form-fitting opening within said leg.

15. The laser scanner of claim 1, wherein said receiver is comprised within a fourth module.

16. The laser scanner of claim 15, wherein said fourth module is arranged laterally and at an upper side of said measuring head.

17. The laser scanner of claim 1, wherein said receiver comprises a range finder.

18. The laser scanner of claim 1, wherein said transmitter is comprised within said third module.

19. The laser scanner of claim 1, wherein said computer is comprised within a fifth module.

20. The laser scanner of claim 1, wherein said computer comprises a control panel.

21. The laser scanner of claim 19, wherein said fifth module is arranged laterally and at a lower side of said measuring head.

22. The laser scanner of claim 15, wherein said third and said fourth module are arranged on opposite sides of said first module.

23. The laser scanner of claim 19, wherein said second and said fifth module are arranged on opposite sides of said first module.

24. The laser scanner of claim 1, wherein said first and said third modules are mechanically interconnected by means of form fitting mechanical connectors.

25. The laser scanner of claim 15, wherein said first and said fourth modules are mechanically interconnected by means of form fitting mechanical connectors.

26. The laser scanner of claim 19, wherein said first and said fifth modules are mechanically interconnected by means of form fitting mechanical connectors.

27. The laser scanner of claim 1, wherein said first and said second modules are configured integral with each other.

28. The laser scanner of claim 1, wherein said first and third modules are electrically interconnected by means of a CAN bus.

29. The laser scanner of claim 15, wherein said first, third and fourth modules are electrically interconnected by means of a CAN bus.

30. The laser scanner of claim 19, wherein said first, third and fifth modules are electrically interconnected by means of a CAN bus.

31. The laser scanner of claim 1, wherein said first axis extends vertically under normal operational conditions of said laser scanner.

32. The laser scanner of claim 1, wherein said second axis extends horizontally under normal operational conditions of said laser scanner.

33. The laser scanner of claim 2, wherein said base is held stationary under normal operational conditions of said laser scanner.

* * * * *